United States Patent [19]

Ogawa et al.

[11] Patent Number: 4,506,043
[45] Date of Patent: Mar. 19, 1985

[54] GLASS FIBER-REINFORCED THERMOPLASTIC POLYESTER COMPOSITION

[75] Inventors: Yoshinari Ogawa; Kouichi Sakai; Noriyuki Akagi, all of Sagamihara, Japan

[73] Assignee: Teijin Limited, Osaka, Japan

[21] Appl. No.: 481,444

[22] Filed: Apr. 8, 1983

Related U.S. Application Data

[63] Continuation of Ser. No. 252,118, Apr. 8, 1981.

[30] Foreign Application Priority Data

Apr. 11, 1980 [JP] Japan .................................. 55-46797
Jun. 4, 1980 [JP] Japan .................................. 55-74188

[51] Int. Cl.³ ............................................... C08K 7/14
[52] U.S. Cl. ...................................... 523/523; 524/394
[58] Field of Search ........................ 523/523; 524/394

[56] References Cited

U.S. PATENT DOCUMENTS

| | | | |
|---|---|---|---|
| 3,435,093 | 3/1969 | Cope | 523/523 |
| 3,639,527 | 2/1972 | Brinkmann et al. | 260/873 |
| 3,761,450 | 9/1973 | Herwig et al. | 260/75 |
| 4,276,208 | 6/1981 | Ogawa et al. | 523/523 |

FOREIGN PATENT DOCUMENTS

| | | |
|---|---|---|
| 29971 | 8/1971 | Japan . |
| 14502 | 5/1972 | Japan . |
| 57-55955 | 4/1982 | Japan .................................. 524/394 |
| 57-90040 | 6/1982 | Japan .................................. 524/394 |
| 1249252 | 10/1971 | United Kingdom . |

*Primary Examiner*—Lewis T. Jacobs
*Assistant Examiner*—Robert E. L. Sellers, II
*Attorney, Agent, or Firm*—Sherman & Shalloway

[57] ABSTRACT

A glass fiber-reinforced thermoplastic polyester composition composed of (A) 100 parts by weight of a polyethylene terephthalate resin having an intrinsic viscosity, measured at 35° C. in ortho-chlorophenol, of from 0.4 to 0.9 and comprising at least 80 mole %, based on the total acid component, of terephthalic acid or an ester-forming derivative thereof and at least 80 mole %, based on the total polyol component, of ethylene glycol or an ester-forming derivative thereof.

(B) 5 to 200 parts by weight of glass fibers having an average length of at least 0.2 mm, (C) 0.05 to 3 parts by weight of a partially esterified montan wax acid having a neutralization value (NV) and a saponification value (SV) which are in the following relation $$50 \leqq NV \leqq 110 \tag{1}$$

$$100 \leqq SV \leqq 180 \tag{2}$$

$$10 \leqq (SV - NV) \leqq 100 \tag{3}$$

and (D) at least one component selected from the group consisting of (D₁) 0.01 to 3 parts by weight of a sodium or potassium salt of a monocarboxylic acid having 2 to 28 carbon atoms and (D₂) 0.1 to 10 parts by weight of an ionic copolymer of an α-olefin and an α,β-unsaturated carboxylic acid, said copolymer containing a mono- to tri-valent metal ion.

13 Claims, No Drawings

GLASS FIBER-REINFORCED THERMOPLASTIC POLYESTER COMPOSITION

This application is a continuation of application Ser. No. 252,118, filed Apr. 8, 1981.

This invention relates to a thermoplastic polyester composition, and specifically, to an improved glass fiber-reinforced thermoplastic polyester composition which is advantageously free from many troubles associated with glass fiber reinforcement and which has excellent moldability to give molded articles having excellent and uniform quality and excellent surface properties.

More specifically, this invention pertains to a glass fiber-reinforced thermoplastic polyester composition composed of (A) 100 parts by weight of a polyethylene terephthalate resin having an intrinsic viscosity, measured at 35° C. in ortho-chlorophenol, of from 0.4 to 0.9 and comprising at least 80 mole%, based on the total acid component, of terephthalic acid or an ester-forming derivative thereof and at least 80 mole%, based on the total polyol component, of ethylene glycol or an ester-forming derivative thereof, (B) 5 to 200 parts by weight of glass fibers having an average length of at least 0.2 mm, (C) 0.05 to 3 parts by weight of a partially esterified montan wax acid having a neutralization value (NV) and a saponification value (SV) which are in the following relation $$50 \leq NV \leq 110 \tag{1}$$

$$100 \leq SV \leq 180 \tag{2}$$

$$10 \leq (SV - NV) \leq 100 \tag{3}$$

and (D) at least one component selected from the group consisting of
  ($D_1$) 0.01 to 3 parts by weight of a sodium or potassium salt of a monocarboxylic acid having 2 to 28 carbon atoms and
  ($D_2$) 0.1 to 10 parts by weight of an ionic copolymer of an α-olefin and an α,β-unsaturated carboxylic acid, said copolymer containing a mono- to trivalent metal ion.

The aforesaid composition may further include at least one additive selected from the group consisting of coloration inhibitors, nucleating agents, coloring agents, stabilizers, fire retardants, ultraviolet absorbers, antioxidants, lubricants, fillers, other resins and antistatic agents.

Linear saturated polyesters such as polyethylene terephthalate have long gained commercial acceptance as fibers, films, engineering plastics, etc. because of their excellent physical and chemical properties, and in recent years, their development as engineering plastics has attracted special attention. The inherent properties of the linear saturated polyesters, however, are not sufficient for engineering plastics, and various improvements have been made to make them suitable as engineering plastics. It is known, for example, that a nucleating agent such as a particulate solid inorganic or organic substance is mixed with a linear saturated polyester derived from terephthalic acid in order to increase its rate of crystallization in a mold, thereby increasing the density of a molded article prepared from it and improving the dimensional stability of the molded article at high temperatures, and to shorten the molding cycle thereby increasing productivity. Inorganic substances known to be effective as such a nucleating agent include fine particles of metal oxides, alkaline earth metal salts, talc powder, glass powder, and metal powders having a particle diameter of not more than 5 microns. Known organic nucleating agents include metal salts of long-chain paraffins or higher fatty acid esters such as stearic acid, behenic acid and montanic acid.

With a view to increasing the rate of crystallization of a polyester and shortening the injection cycle, British Pat. No. 1,249,252 (published on Oct. 13, 1971) discloses granules of a composition comprising (a) a linear saturated polyester, (b) from 0 to 3%, calculated on the weight of the polyester, of an inert solid inorganic substance having a particle size of less than 5 microns, (c) from 0 to 2%, calculated on the weight of polyester, of a polyfunctional epoxy compound, and (d) from 0 to 1.5%, calculated on the weight of the polyester, of a neutral or partially neutralized salt of montan wax or of a montan wax ester; said granules having a moisture content of less than 0.01% by weight and a reduced viscosity, measured with a 1% solution in at 60:40 mixture of phenol and tetrachloroethane at 25° C., of at least 1.25 dl/g, and said granules having been coated with from 0.01 to 1% by weight, calculated on the weight of the polyester, of a neutral or partially neutralized salt of montan wax or of a montan wax ester.

The above British Patent does not at all state the incorporation of glass fibers and other reinforcing materials and technical troubles which may arise at the time of incorporating these materials.

Incorporation of glass fibers is known to improve the mechanical and other physical properties of polyethylene terephthalate. This method has the advantage of also improving the thermal properties of the polyester composition. The glass fiber-reinforced thermoplastic polyester composition, however, causes different technical troubles from those encountered by polyethylene terephthalate not reinforced with glass fibers. One typical trouble is the extremely reduced moldability of the polyester composition which is caused as a result of reinforcement with glass fibers. For example, when a glass fiber-reinforced thermoplastic polyester composition is to be injection molded, the composition fed into a hopper of an injection molding machine does not go smoothly and uniformly into screw channels of the injection molding machine, and consequently, its metering becomes very unstable. This causes an increased frequency of forming molded articles with short shots, and the composition becomes a molding material having "poor feedability". This defect can be remedied to some extent by changing the shape of the screw or hopper or the size and shape of the molten material. However, intrinsically, this trouble is not easy to remove because the difference in shrinkage between the polyester and the glass fibers in the composition causes marked unevenness on the surface of the composition, and leads to the exposure of the glass fibers on the cut surface of the composition, and slippage between the pellets of the molding material is reduced.

Another trouble is that polyethylene terephthalate having a relatively high intrinsic viscosity is difficult to utilize. Generally, the degree of polymerization of polyethylene terephthalate not reinforced with glass fibers must be increased as much as possible because its mechanical and other physical properties are markedly affected by its degree of polymerization. Thus, it is believed in the art that the intrinsic viscosity of polyethylene terephthalate should be at least 0.9, especially at least 1. However, when the intrinsic viscosity of the polyester is very high in the glass fiber-reinforced thermoplastic polyester composition, the melt viscosity of the composition becomes high, and the impregnability of the polyester in glass fibers is poor. As a result, the dispersibility of the glass fibers in the polyester is reduced to afford a non-homogeneous molding material. Therefore, the mechanical and thermal properties of molded articles prepared from this molding material are deteriorated, and variations may occur in these properties to such an extent that in certain applications, the molded articles will be useless.

Still another trouble is the occurrence of clouding on the surface of molded articles, which defect is associated with the selection for the purpose of incorporating glass fibers of polyethylene terephthalate having a lower intrinsic viscosity than that of polyethylene terephthalate not reinforced with glass fibers. This phenomenon is pronounced with a glass fiber-reinforced polyethylene terephthalate composition, and is presumed to be attributed to oligomers of the polyester. It is presumed that the oligomers come onto the surface of the mold during the solidification-crystallization of the composition in the mold, and cause clouding of the surfaces of the molded article and the mold. When a composition of polyethylene terephthalate is to be molded, the temperature of the mold is heated in advance to 120° to 150° C. in order to accelerate its crystallization during molding. Thus, the clouding phenomenon is especially marked with the polyethylene terephthalate composition. The phenomenon deteriorates the appearance of the molding products and markedly reduces their merchandise values.

The degree of the clouding phenomenon increases with decreasing degrees of polymerization of the polyester. Since a polyester having a sufficiently high intrinsic viscosity is difficult to use in a glass fiber-reinforced polyester composition as stated hereinabove, this clouding phenomenon increases particularly with glass fiber-reinforced thermoplastic polyesters.

Co-pending U.S. patent application Ser. No. 82,970 filed Oct. 9, 1979 now U.S. Pat. No. 4,276,208, issued June 30, 1981, whose inventorship partly overlaps that of the present application proposes a glass fiber-reinforced thermoplastic polyester composition which can advantageously eliminate the new troubles not seen in polyesters that are not reinforced with glass fibers, for example the reduced moldability, the restrictions on the use of a polyester having a sufficiently high intrinsic viscosity, and the occurrence of the clouding phenomenon. Specifically, this thermoplastic polyester composition comprises (a) 100 parts by weight of polyethylene terephthalate having an intrinsic viscosity, measured at 35° C. in ortho-chlorophenol, of from 0.4 to 0.9, (b) 0.05 to 3 parts by weight of a salt of montan wax, (c) 5 to 200 parts by weight of glass fibers having an average length of at least 0.2 mm, and (d) 0 to 5 parts by weight of an epoxy compound having at least two epoxy groups in the molecule.

The present inventors made investigations in order to provide a more improved glass fiber-reinforced thermoplastic polyester composition, and found that it is extremely difficult to obtain both excellent nucleating activity and excellent mold releasability and there is a new technical problem of how to provide a composition having these two properties simultaneously.

Further investigations made in order to solve this new technical problem have led to the discovery that a combination of the partially esterified montax wax acid having a specified neutralization value (NV) and a specified saponification value (SV) [component (C)] with at least one component [component (D)] selected from the group consisting of ($D_1$) a sodium or potassium salt of a monocarboxylic acid having 2 to 28 carbon atoms and ($D_2$) an ionic copolymer of an $\alpha$-olefin and an $\alpha,\beta$-unsaturated carboxylic acid having a mono- to trivalent metal ion can impart both excellent nucleating activity and excellent mold releasability to a glass fiber-reinforced thermoplastic polyester composition containing the polyethylene terephthalate resin (A), and consequently that an improved composition having more improved moldability capable of giving molded articles having excellent and uniform quality and more improved surface properties can be provided without causing the many troubles associated with glass fiber reinforcement.

Investigations of the present inventors have shown that when both the sodium or potassium salt of a monocarboxylic acid having 2 to 28 carbon atoms and montan wax acid, or both the ionic copolymer of an $\alpha$-olefin and an $\alpha,\beta$-unsaturated carboxylic acid and montan wax acid are simultaneously incorporated into a polyethylene terephthalate resin, the degree of polymerization of the polyethylene terephthalate resin is markedly reduced and consequently, molded articles prepared therefrom have extremely reduced strength and poor surface properties, particularly a surface whitening phenomenon.

Unexpectedly, the present inventors have found that the aforesaid further improvements can be achieved without any likelihood of causing such troubles by utilizing the glass fibers (B) and the combination of the partly esterified montan wax acid having the specified neutralization and saponification values (C) and the component (D) selected from the components ($D_1$) and ($D_2$) for incorporation into the polyethylene terephthalate resin (A).

It is an object of this invention therefore to provide a glass fiber-reinforced thermoplastic polyester composition which can advantageously overcome the various technical disadvantages described hereinabove.

The above and other objects and advantages of this invention will become more apparent from the following description.

The polyester used in the composition of this invention is polyethylene terephthalate having an intrinsic viscosity, measured at 35° C. in ortho-chlorophenol, of from 0.4 to 0.9, preferably from 0.45 to 0.8, and comprising at least 80 mole%, preferably at least 90 mole%, based on the total acid component, of terephthalic acid or an ester-forming derivative thereof and at least 80 mole%, preferably at least 90 mole%, based on the total polyol component, of ethylene glycol or an ester-forming derivative thereof.

This polyethylene terephthalate is well known, and can be derived from terephthalic acid or its ester-forming derivative and ethylene glycol or its ester-forming derivative. It includes not only polyethylene terephthalate, but also copolyesters consisting of at least 80 mole% of terephthalic acid or its ester forming derivative and ethylene glycol or its ester-forming derivative, and the remainder preferably being a $C_3$–$C_6$ glycol such as propylene glycol, hexamethylene glycol or tetramethylene glycol and/or a dicarboxylic acid component such as isophthalic acid or naphthalene-2,6-dicarboxylic acid, for example.

In addition to the above exemplification, examples of the other acid component or other diol components include isophthalic acid, naphthalene-2,6-dicarboxylic acid, adipic acid, trimethylene glycol, tetramethylene glycol, neopentyl glycol, hexamethylene glycol, diethylene glycol, cyclohexanediol, cyclohexane dimethanol, 1,4-bishydroxyethoxybenzene, bisphenol A, polyethylene ether glycol, polytetramethylene ether glycol, and the ester-forming derivatives of these compounds.

The polyethylene terephthalate resin (A) used in the composition of this invention has an intrinsic viscosity $[\eta]$, measured at 35° C. in ortho-chlorophenol, of 0.4 to 0.9, preferably 0.45 to 0.8. The intrinsic viscosity of 0.9 corresponds to a reduced viscosity of about 1.17 specified in the above-cited British Patent, and the intrinsic viscosity of 0.8 corresponds to a reduced viscosity of 1.04. The use of polyethylene terephthalate having a lower intrinsic viscosity than the specified limit gives a composition showing unsatisfactory mechanical strength and thermal properties, and the use of polyethylene terephthalate having a higher intrinsic viscosity than the specified limit undesirably increases the melt viscosity of the resulting composition and deteriorates moldability and other properties. Accordingly, the intrinsic viscosity of the polyethylene terephthalate should be within the specified range.

Another essential component of the composition of this invention is (B) glass fibers having an average length of at least 0.2 mm in an amount of 5 to 200 parts by weight per 100 parts by weight of the polyethylene terephthalate (A).

All glass fibers available commercially for resin reinforcement can be used as the glass fibers (B). The average length (measured by the method to be described hereinbelow) is at least 0.2 mm, for example about 0.2 to 10 mm. When the average length is less than 0.2 mm and the proportion of finer glass fibers increases, the mechanical strength, especially impact strength, of molded articles prepared from the resulting composition is reduced extremely, and their heat distortion temperature also decreases. The diameter (measured by the method to be described hereinbelow) of the glass fibers can be properly selected, and is, for example, about 8 to 20 microns on an average.

The suitable amount of the glass fibers (B) is 5 to 200 parts by weight per 100 parts by weight of the polyethylene terephthalate (A). If the amount of the glass fibers is smaller than the specified limit, the heat distortion temperature and surface hardness of a molded article prepared from the resulting resin composition are reduced. If it exceeds the specified limit, the resulting composition is difficult to mold.

The glass fibers used as component (B) include long fiber types (glass rovings), and chopped strands of short fibers. These glass fibers may be treated with surface-treating agents such as bundling agents (e.g., polyvinyl acetate and polyester-type bundling agents), and coupling agents (e.g., silane compounds and borane compounds). They may also be coated with resins such as thermoplastic resins and thermosetting resins. Usually, long glass fibers may be cut to the desired length before or after blending with the polyethylene terephthalate resin (A).

The glass fibers (B) may be surface-coated with an epoxy compound having at least two epoxy groups in the molecule, and this is preferable in order to increase the mechanical strength of the composition of this invention further. Examples of the surface-coating epoxy compound include bisphenol A-type epoxy compound (the average degree of polymerization: not more than 20, preferably not more than 15) obtained by reacting bisphenol A with epichlorohydrin, bisphenol F-type epoxy compound (the average degree of polymerization not more than 20, preferably not more than 15) obtained by reacting 4,4'-dihydroxydiphenylmethane with epichlorohydrin, poly(alkylene ether glycol diglycidyl ethers) such as polyethylene glycol diglycidyl ether or polypropylene glycol diglycidyl ether, alkylene glycol diglycidyl ethers such as ethylene glycol diglycidyl ether or butanediol-1,4-diglycidyl ether, sorbitol polyglycidyl ether, glycerol polyglycidyl ether, diglycerol polyglycidyl ether, vinyl cyclohexane dioxide, dicyclopentadiene dioxide, 3,4-epoxy-6-methylcyclohexylmethyl-3,4-epoxy-6-methycyclohexane carbonate, and a novolac-type epoxy compound derived from a novolac resin and epichlorohydrin. These epoxy comounds can be used either alone or in combination with one another.

The amount of the surface-coating epoxy compound can be selected as desired. It is preferably 0.1 to 10% by weight, more preferably 0.1 to 5% by weight, based on the weight of the glass fibers (B). The surface coating means can be properly selected. The most preferred means is to use the aforesaid epoxy compound as a part or the whole of a coupling agent in the manufacture of glass fibers. At this time, another resin having good film-forming ability such as polyvinyl acetate is preferably used together. When the coated surfaces of glass fibers become tacky because of the use of a relatively large amount of a liquid epoxy compound, the handling of the glass fibers can be made easy by, for example, coating both the epoxy compound and a curing agent of the acid anhydride or amine type, and then subjecting the coated glass fibers to a moderate heat-treatment to prevent tackiness. Of course, it is possible to use various coupling agents together with these polyfunctional epoxy compounds.

In the composition of this invention, the use of a combination of the components (C) and (D) together with the components (A) and (B) is essential.

(C) 0.05 to 3 parts by weight of a partially esterified montan wax acid having a neutralization value (NV) and a saponification value (SV) which are in the following relation $$50 \leq NV \leq 110 \quad (1)$$

$$100 \leq SV \leq 180 \quad (2)$$

$$10 \leq (SV - NV) \leq 100 \quad (3)$$

(D) at least one component selected from the group consisting of ($D_1$) 0.01 to 3 parts by weight of a sodium or potassium salt of a monocarboxylic acid having 2 to 28 carbon atoms and ($D_2$) 0.1 to 10 parts by weight of an ionic copolymer of an $\alpha$-olefin and an $\alpha,\beta$-unsaturated carboxylic acid, said copolymer containing a mono- to trivalent metal ion.

The partially esterified montan wax acid means a partially esterified product of montan wax acid. The montan wax acid is a mixture of saturated aliphatic monocarboxylic acids having a chain length with 20 to 32 carbon atoms. A general example of the montan wax acid is a compound prepared by oxidizing montan wax (obtained by purifying lignite) with an oxidizing agent such as a mixed chromic acid.

The partially esterified montan wax acid is prepared by partially esterifying the montan wax acid with a monohydric or dihydric alcohol, preferably a dihydric alcohol having 2 to 4 carbon atoms in the alkylene group, so that the relation expressed by formulae (1), (2) and (3) is fulfilled.

The neutralization value and the saponification value are measured in accordance with JIS K-3341.

Examples of the dihydric alcohol to be used for esterification include ethylene glycol, 1,2-propanediol, 1,3-propanediol, 1,3-butanediol and 1,4-butanediol.

The partially esterified montan wax acid (C) does not cause an undesirable decrease in the molecular weight of the polyethylene terephthalate resin (A) as does montan wax acid. In combination with the component (D), it exhibits an excellent mold releasing action.

The NV and SV of the partially esterified montan wax acid (C) greatly affect the mold releasability and the degradation (especially the reduction of molecular weight) of the glass fiber-reinforced thermoplastic polyester composition. In order to impart a mold releasing action, the NV and SV sould be within the certain ranges represented by formulae (1) and (2), and in addition, the value (SV−NV) should be within the range specified by formula (3). If the (SV−NV) value is less than 10, the molecular weight of the polyethylene terephthalate resin (A) is markedly reduced, and if it exceeds 100, the mold releasing action is extremely slight. The preferred range of the (SV−NV) is from 20 to 80.

The amount of the partially esterified montan wax acid (C) is 0.05 to 3 parts by weight per 100 parts by weight of the polyethylene terephthalate resin (A). If the amount is less than 0.05 part by weight, the component (C) shows scarcely any appreciable effect as a mold releasing agent. If, on the other hand, it is used in an amount of more than 3 parts by weight, its mold releasing effect reaches saturation and does not increase further, and rather it tends to reduce the molecular weight of the polyethylene terephthalate resin (A).

The component ($D_1$) used in combination with the component (C) is a sodium or potassium salt of a monocarboxylic acid having the following formula

R—COOH wherein R represents a hydrocarbon group having 1 to 27 carbon atoms. If desired, the sodium and potassium salts may be used together. R in the above formula includes, for example, alkyl groups, cyclic hydrocarbon groups having a cyclo or benzene ring, and aralkyl groups. Preferably, R is an alkyl or aryl group. Examples of especially suitable sodium or potassium salts of organic monocarboxylic acids are sodium or potassium salts of saturated fatty acids such as acetic acid, propionic acid, caproic acid, caprylic acid, lauric acid, myristic acid, palmitic acid, stearic acid and behenic acid, and sodium or potassium salts of benzoic acid. These salts act uniquely as a nucleating agent for polyethylene terephthalate resins, and exhibit effects not seen in other metal salts or compounds. In combination with component (C), the component ($D_1$) exhibits a superior mold releasing action.

The desirable amount of the sodium or potassium salt of an organic monocarboxylic acid ($D_1$) is 0.01 to 3 parts by weight per 100 parts by weight of the polyethylene terephthalate resin (A). If its amount is less than 0.01 part by weight, there is scarcely any effect as a nucleating agent. On the other hand, even if it is used in an amount exceeding 3 parts by weight, its effect as a nucleating agent cannot be increased. Rather, it impairs the effect of preventing molecular weight decrease of the polyethylene terephthalate resin (A).

The component ($D_2$) is a known additive for polyesters, and can be prepared, for example, by the method described in Japanese Patent Publication No. 6810/1964 (corresponding British Pat. Nos. 1011981, 1029035, 1034268, 1063436).

A copolymer having recurring units of the following formula can be used as the ionic copolymer ($D_2$).

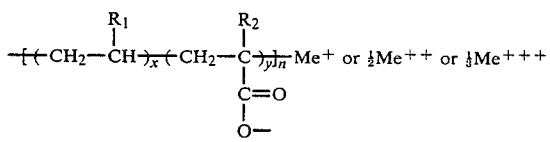

wherein $R_1$ represents hydrogen, an alkyl group having 1 to 12 carbon atoms or a phenyl group; $R_2$ represents a methyl or ethyl group; $Me^+$ represents a monovalent metal ion such as $Na^+$, $K^+$, $Li^+$, $Cs^+$, $Ag^+$, $Hg^+$, and $Cu^+$; $Me^{++}$ represents a divalent metal ion such as $Be^{++}$, $Mg^{++}$, $Ca^{++}$, $Sr^{++}$, $Ba^{++}$, $Cu^{++}$, $Cd^{++}$, $Hg^{++}$, $Sn^{++}$, $Pb^{++}$, $Fe^{++}$, $Co^{++}$, $Ni^{++}$, and $Zn^{++}$; $Me^{+++}$ represents a trivalent metal ion such as $Al^{+++}$, $Sc^{+++}$, $Fe^{+++}$ and $Yt^{+++}$; and x, y and n are positive numbers, and for example $1 \leq x \leq 100$, $1 \leq y \leq 100$, $10 \leq n \leq 10000$.

Known graft copolymers may also be used as the ionic copolymer. These graft copolymers can be produced by methods known per se, for example by grafting an ester of an α,β-unsaturated carboxylic acid to a polyolefin, especially polyethylene, saponifying the grafted product, and then reacting the saponified product with an alkali metal hydroxide. In such a copolymer, the content of the olefin is preferably at least 50% by weight, especially preferably 80 to 99% by weight.

Polymers containing the following units (a), (b) and (c) can also be used as the ionic copolymer ($D_2$).

(a)

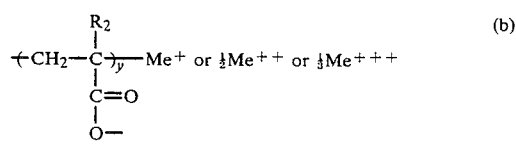

(b)

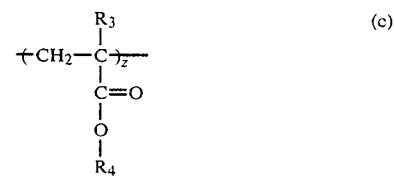

(c)

In the above formulae, $R_1$ represents hydrogen, an alkyl group having 1 to 12 carbon atoms, or a phenyl group; $R_2$ represents hydrogen or a methyl or ethyl group; $R_3$ represents hydrogen or a methyl or ethyl group; $R_4$ represents hydrogen or an alkyl group having 1 to 12 carbon atoms; and x, y and z are positive numbers, for example $1 \leq x \leq 100$, $1 \leq y \leq 100$, and $1 \leq x \leq 100$.

The ionic copolymers containing above (a), (b) and (c) preferably have an olefin content of at least 50% by weight, especially preferably 80 to 90% by weight. Desirably, the total amount of the ester component and the ionic component in the ionic copolymer is at least 10% by weight, and the proportion of the ionic component is at least 3% by weight based on the total weight of the ionic copolymer.

Specific examples of the ionic copolymer portion of the component ($D_2$) include an ethylene/acrylic acid copolymer, an ethylene/methacrylic acid copolymer, an ethylene/itaconic acid copolymer, an ethylene/maleic acid copolymer, an ethylene/monomethyl maleate copolymer, an ethylene/acrylic acid/methyl methacrylate copolymer, an ethylene/methacrylic acid-/ethyl acrylate copolymer, an ethylene/itaconic acid/-methyl methacrylate copolymer, an ethylene/-monomethyl maleate/ethyl acrylate copolymer, an ethylene/methacrylic acid/vinyl acetate copolymer, an ethylene/acrylic acid/vinyl alcohol copolymer, an ethylene/propylene/acrylic acid copolymer, an ethylene/styrene/acrylic acid copolymer, an ethylene/-methacrylic acid/acrylonitrile copolymer, an ethylene/fumaric acid/vinyl methyl ether copolymer, an ethylene/vinyl chloride/acrylic acid copolymer, an ethylene/vinylidene chloride/acrylic acid copolymer, an ethylene/vinyl fluoride/methacrylic acid copolymer, an ethylene/chlorotrifluoroethylene/methacrylic acid copolymer, a polyethylene/acrylic acid graft copolymer, a polyethylene/methacrylic acid graft copolymer, a polyethylene/propylene/acrylic acid graft copolymer, a polyethylene/butene-1/methacrylic acid graft copolymer, a polypropylene/acrylic acid graft copolymer, a polypropylene/methacrylic acid graft copolymer, a polybutene/acrylic acid graft copolymer, a poly-3-methylbutene/acrylic acid graft copolymer, and a polyethylene/acrylic acid/ethyl acrylate graft copolymer.

Not all of the carboxyl groups in the ionic copolymer ($D_2$) need to be neutralized with the metal ion. Preferably, however, at least 10% of the carboxyl groups are neutralized with the metal ion. Alkali metal ions, particularly a sodium ion, are conveniently used as the metal ion.

An especially convenient copolymer as the ionic copolymer ($D_2$) is an ionic copolymer composed of ethylene and (meth)acrylic acid and containing an alkali metal ion, especially a sodium ion.

The amount of the ionic copolymer ($D_2$) to be incorporated in the composition of this invention is 0.1 to 10 parts by weight per 100 parts by weight of the polyethylene terephthalate resin (A). If the amount is less than 0.1 part by weight, its effect as a nucleating agent is scarcely noted. On the other hand, if its amount exceeds 10 parts by weight, its effect as a nucleating agent is not increased, but rather results in impairing the effect of preventing molecular weight decrease of the polyethylene terephthalate resin (A).

The glass fiber-reinforced thermoplastic polyester composition of this invention may further contain at least one additive selected from the group consisting of nucleating agents, coloring agents, fire retardants, ultraviolet absorbers, antioxidants, coloration inhibitors, fillers, other resins and antistatic agents.

Examples of the nucleating agents are powders of inorganic substances such as talc, clay, $SiO_2$, $Al_2O_3$, $TiO_2$, graphite, $CaCO_3$, $MgCO_3$, ZnO, $CaSO_4$, and aluminum silicate. The amounts of the nucleating agent is properly chosen. For example, it is about 0.01 to about 5% by weight based on the weight of the polyethylene terephthalate resin (A). Preferably, the nucleating agents have an average particle diameter of not more than 20 microns, especially not more than 5 microns.

Examples of the coloring agents are dyes such as azo types and anthraquinone dyes, organic pigments such as azo pigments, phthalocyanine pigments and quinacridone pigments, and inorganic pigments such as titanium oxide, carbon black, red iron oxide and cadmium sulfide. The amount of the coloring agents is selected properly. For example, it is about 0.01 to about 5% by weight, preferably about 0.05 to about 2% by weight, based on the weight of the polyethylene terephthalate resin (A).

Examples of the fire retardants include halogen-containing compounds such as brominated biphenyl ether, polycarbonate produced from a ring-brominated product of bisphenol A, elemental phosphorus, phosphorus compounds such as triphenyl phosphate, and compounds having a phosphorus-nitrogen bond such as phosphoramide. The amount of the fire retardant is selected properly. For example, it is about 0.5 to about 50% by weight, preferably about 3 to about 25% by weight, based on the weight of the polyethylene terephthalate resin (A).

Examples of the ultraviolet absorbers include benzophenone compounds such as 2-hydroxy-4-methoxybenzophenone, benzotriazole compounds such as (2-hydroxy-5-methylphenyl)benzotriazole, and salicylate compounds such as phenyl salicylate. The amount of the ultraviolet absorber is properly chosen. For example, it is about 0.01 to about 2% by weight, preferably about 0.05 to about 1% by weight, based on the weight of the polyethylene terephthalate resin (A).

Examples of the antioxidant include hindered phenol compounds such as 2,4,6-tri-tert.butyl phenol, sulfur-containing compounds such as dilauryl thiodipropionate, and amine compounds such as phenyl-α-naphthylamine. The amount of the anitioxidant is properly chosen. For example, it is about 0.01 to about 2% by weight, preferably about 0.05 to about 1% by weight, based on the weight of the polyethylene terephthalate resin (A).

Examples of coloration inhibitors include phosphorus compounds and hindered phenol compounds. Specific examples of the phosphorus compounds as coloration inhibitors include phosphoric acid, phosphoric acid esters such as trimethyl phosphate, methyldiethyl phosphate, triethyl phosphate, triisobutyl phosphate, tributyl phosphate and triphenyl phosphate, phosphorous acid, phosphorous acid esters such as trimethyl phosphite, triethyl phosphite, and triphenyl phosphite, phosphonic acid, phosphonic acid derivatives such as phenylphosphonic acid and phenyl phenylphosphonate, phosphinic acid, and phosphinic acid derivatives such as dimethylphosphinic acid. Of these, the phosphates such as trimethyl or triphenyl phosphate are especially preferred. Specific examples of the hindered phenol compounds are 2,6-di-tert.butyl-p-cresol, 2,4,6-tri-tert.butylphenol, 1,3,5-trimethyl-2,4,6-tris(3,5-di-tert.butyl-4-hydroxybenzyl)benzene, n-octadecyl-3-(4'-hydroxy-3',5'-di-tert.butylphenol)propionate, and tetrakis[methylene-3-(3,5-di-tert.butyl-4-hydroxyphenyl)propionate]methane. These phosphorus compounds and hindered phenol compounds may be used singly, but produce a better effect when used in combination with one another. The amount of the coloration inhibitor is, for example, 0.01 to 2 parts by weight per 100 parts by weight of the polyethylene terephthalate resin (A).

Examples of the fillers include fibrous fillers such as asbestos, carbon fibers, polyamide fibers, gypsum whiskers and potassium titanate whiskers, and non-fibrous fillers such as mica, clay, talc, calcium carbonate, silica, feldspar, calcium sulfate, titanium dioxide, graphite, carbon black, glass beads, glass flakes, ferrite, calcium sulfite and magnesium oxide. The amount of the filler is selected properly. For example, it is about 1 to about 80% by weight, preferably about 5 to about 50% by weight, based on the weight of the polyethylene terephthalate resin (A).

Examples of the antistatic agent include cationic surface active agents such as stearamidopropyl dimethyl-$\beta$-hydroxymethyl ammonium nitrate, anionic surface active agents such as alkylaryl sulfates, and nonionic surface active agents such as polyethylene oxide. The amount of the antistatic agent is selected properly. For example, it is about 0.01 to about 5% by weight, preferably about 0.05 to about 2% by weight, based on the weight of the polyethylene terephthalate resin (A).

If desired, the polyester composition of this invention may contain a small amount, for example, up to about 100 parts by weight of the polyethylene terephthalate resin (A) of another resin including thermoplastic resins such as styrene resins, acrylic resins, polyethylene, polypropylene, fluorocarbon resins, polyamide resins, polycarbonate resins, and polysulfone, thermosetting resins such as phenolic resins, melamine resins, unsaturated polyester resins, and silicone resins, and soft thermoplastic resins such as an ethylene/vinyl acetate copolymer, polyester elastomers, and an ethylene/propylene/diene terpolymer.

The glass fiber-reinforced thermoplastic polyester composition of this invention can be produced by blending as uniformly as possible the polyethylene terephthalate resin (A), the glass fibers (B), the partly esterified montan wax acid (C) and the compound (D) and optionally the additives.

Blending can be effected by any desired means. Usually, it is preferred to disperse these ingredients as uniformly as possible. All of the ingredients are preferably mixed simultaneously or separately by a blender, kneader, roll, extruder, or the like to make a uniform blend. A method is also preferably used in which at least two of the mixing ingredients are mixed by a blender, kneader, roll, extruder, or the like, and the resulting mixture is melt-kneaded with the remaining ingredients in an extruder to make a uniform blend. More preferably, the partly esterified montan wax acid (C) is incorporated uniformly to the inside of the composition. The most common method is to melt-knead a previously dry-blended composition further in a heated extruder, extrude the uniform composition into a wire form, and cutting it to the desired length to form granules. The resulting molding composition is usually maintained in the fully dried state, and put into a hopper of a molding machine for molding.

Another method is to add and mix the other ingredients before, during or after polycondensation in the production of the polyethylene terephthalate resin (A).

The glass fibers may be dry-blended without being melt-kneaded with the other ingredients in an extruder in order to prevent excessive crushing of the glass fibers and improve their operability during the production of the composition. For example, the granular polyethylene terephthalate produced in an extruder and not containing glass fibers may be put into a hopper of a molding machine together with a predetermined amount of a chopped glass strand or with another thermoplastic resin prepared in advance and containing glass fibers in a large proportion.

Preferably, the component (D) is added together with the other mixing ingredients at the time of melt-extruding the polyester, or is fed together with the granulated polyester into a hopper of a molding machine at the time of molding the granulated polyester composition.

The glass fiber-reinforced thermoplastic polyester composition of this invention may be in the form of molding granular materials such as molding pellets, and also in the form of shaped articles of the desired configurations. The molding can be performed by any known means such as injection molding and compression molding.

The molding temperature and the molding time can be properly chosen by the type of the composition, the type of the molding, etc. For example, in injection molding, the cylinder temperature is 250° to 300° C., the molding cycle is 15 to 120 seconds, and the injection pressure is 600 to 1400 kg/cm$^2$. The mold needs not to be particularly heated, but when molding is carried out in a mold heated in advance to 100° to 150° C., preferably 120° to 150° C., the rate of crystallization is promoted by the action of the component (D), and a molded article which is homogeneous both inside and outside can be obtained.

The following examples illustrate the present invention more specifically.

The average length and diameter of glass fibers were determined by the following methods.

AVERAGE LENGTH

About 0.57 to 0.7 g of the pellets of the composition was dissolved in 100 ml of ortho-chlorophenol. Glass fibers which remained undissolved were separated by filtration, and used for length measurement.

Glass fibers arbitrarily separated from the starting glass fibers or pellets are placed on a slide glass, and photographed on a scale of 50× using a universal projector (Profile Projector 6CT-2: NIHON KOGAKU K.K.). The length of each of 1000 glass fibers was measured, and based on the measured values, a chart showing the distribution of fiber lengths on a scale of 0.02 mm as actual length was made. From this distribution chart, the product of each fiber length multiplied by the number of fibers having this length is determined and the resulting products for all fiber lengths are summed up and used as the denominator. On the other hand, the product of the square of each fiber length multiplied by the number of fibers having this length is determined, and the resulting products for all fiber lengths are summed up and used as the numerator. Thus, the average fiber length can be calculated from the following equation.

$$\bar{x} = \frac{\sum_{i=1}^{n} (Li)^2 \cdot ni}{\sum_{i=1}^{n} Li \cdot ni}$$

wherein
$\bar{x}$ is the average fiber length,
Li is each fiber length, and
ni is the number of fibers which have the length Li.

FIBER DIAMETER

The diameter of glass fibers in the pellets can be measured from the 50% photograph mentioned above. Since it does not change by molding, it is equal to the diameter of the starting glass fiber.

The moldability, the degree of surface clouding, the occurrence of flashes, and strength were tested and evaluated as follows:

The mold releasability and static strength during molding are measured by the following methods unless otherwise specified.

MOLD RELEASABILITY

Molding pellets as a sample were dried in hot air at 140° C. for 4 hours, and immediately then, molded into a box-like molded article (outside dimension of its bottom portion 128 mm×68 mm; height 39 mm; thickness 2 mm) by a 5-ounce injecting molding machine under the following conditions.

Cylinder temperature: 275° C.
Injecting pressure: 800 kg/cm²
Mold temperature: 140° C.
Cooling time: 25 seconds
Total cycle: 40 seconds The molding machine used in this test was fitted with a dynamic strain gauge between an extruding plate and an extruding pin so that after opening the mold at the end of one molding cycle for releasing the resulting molded article from the mold, the force required for mold releasing (the mold releasing force) could be detected by the dynamic strain gauge through a knockout pin of the mold and the extruding pin of the molding machine.

The degree of difficulty or ease of mold releasing can therefore be expressed by the mold releasing force. Since the force detected by the dynamic strain gauge upon opening of an empty mold not containing the resin is 0.5 kg-weight, the force required to release a molded product therein from the mold is (the measured value—0.5)kg-weight.

This numerical value is called a mold releasing index, and used to express the degree of mold releasability. Thus, smaller mold releasing indices show better mold releasability.

In measuring the mold releasing index, the molding force was measured with regard to the molded articles obtained in the 11th shots after starting of continuous molding to 20th shots. The average value of the measured mold releasing forces was calculated, and 0.5 was subtracted from the average value.

STATIC STRENGTH

Molding pellets as a sample were heated in hot air at 140° C. for 4 hours, and molded under the following conditions by a 5-ounce injection molding machine equipped with a mold for measuring properties.

Cylinder temperature: 280° C.
Mold temperature: 140° C.
Injection pressure: 1000 kg/cm²
Cooling time: 20 seconds
Total molding cycle: 35 seconds Using the resulting test specimens were subjected to a tensile test (ASTM D-638) and a bending test (ASTM D-790).

All parts in these examples are by weight.

EXAMPLES 1 AND 2 AND COMPARATIVE EXAMPLES 1 TO 5

Thirty parts of a chopped strand of glass fibers having a length of 3 mm and each of the components (C) shown in Table 1 in the amounts indicated were added to 70 parts of polyethylene terephthalate resin dried at 120° C. for 5 hours and having an intrinsic viscosity of 0.64, and they were uniformly mixed by a V-type blender.

The mixture was melt-mixed in an extruder having a screw diameter of 65 mm and a barrel temperature of 280° C. The thread extruded from the die was cooled and cut to form molding pellets. The average length of the glass fibers was about 0.36 mm.

Sodium acetate powder (0.1 part) [component D] was added to 100 parts of the pellets, and they were mixed uniformly by a V-type blender. The mixture was molded. The mold releasability of the pellets during the molding and the intrinsic viscosity and static strength of the molded articles as summarized in Table 1.

All of the molded articles had excellent surface properties and equivalent gloss and aesthetic beauty, but their mold releasability and static strength varied depending upon the type and amount of the component (C) used.

TABLE 1

| Example (Ex-) or Comparative Example (CEx.) | Component (C) | | | | |
|---|---|---|---|---|---|
| | Type | NV | SV | SV—NV | Amount (parts) |
| CEx. 1 | WAX—S | 148 | 156 | 8 | 0.5 |
| Ex. 1 | WAX—S/1,3-butanediol ester | 91 | 152 | 61 | 0.5 |
| Ex. 2 | WAX—S/1,3-butanediol ester | 68 | 150 | 82 | 0.5 |
| CEx. 2 | WAX—S/1,3-butanediol ester | 18 | 147 | 129 | 0.5 |
| CEx. 3 | WAX—S/1,3-butanediol ester | 91 | 152 | 61 | 4 |
| CEx. 4 | Stearic acid | 204 | 206 | 2 | 0.5 |
| CEx. 5 | Stearic acid/n-butanol ester | 56 | 193 | 137 | 0.5 |

| Example (Ex.) or Comparative Example (CEx.) | Properties of the molded article | | | | |
|---|---|---|---|---|---|
| | Mold releasing index (kg-weight) | Intrinsic viscosity | Tensile strength (kg/cm²) | Flexural strength (kg/cm²) | Flexural modulus (kg/cm²) |
| CEx. 1 | 6 | 0.52 | 1320 | 1760 | 97,000 |
| Ex. 1 | 8 | 0.59 | 1510 | 2070 | 98,000 |
| Ex. 2 | 11 | 0.60 | 1500 | 2090 | 99,000 |
| CEx. 2 | 58 | 0.60 | 1480 | 2070 | 98,000 |
| CEx. 3 | 5 | 0.48 | 1210 | 1740 | 96,000 |
| CEx. 4 | 47 | 0.51 | 1230 | 1770 | 97,000 |
| CEx. 5 | 72 | 0.57 | 1430 | 1990 | 96,000 |

WAX-S (a product of Hoechst AG, West Germany) used in Comparative Example 1 is montan wax acid described hereinabove. It is seen that the use of WAX-S imparted very good mold releasability, but markedly reduces the intrinsic viscosity of the resulting molded article and thereby drastically reduces the static strength of the molded article.

When WAX-S which is reacted with 1,3-butanediol to esterify its carboxyl groups partially is used as component (C), its effect on mold releasability and static strength vary greatly depending upon the degree of esterification. In Examples 1 and 2, an esterification product obtained by esterifying WAX-S with 0.35 equivalent or 0.5 equivalent of 1,3-butanediol was used. When these esterification products are used as the component (C), both the mold releasability and static strength are superior.

According to Comparative Example 2 in which a product obtained by partially esterifying WAX-S with 0.83 equivalent of 1,3-butanediol is used as the component (C), a reduction in static strength is not noted, but the mold releasability is very poor, and the molded article greatly swells by the pressure of the knockpin of the mold during releasing the molded article from the mold. In Comparative Example 3, the esterification product of WAX-S used in Example 1 is added in a large amount. In this case, the mold releasability is satisfactory, but a drastic decrease in static strength is noted.

In Comparative Examples 4 and 5, stearic acid and an esterification product obtained by esterifying stearic acid with 0.7 equivalent of 1,3-butanediol are used respectively. In both cases, the mold releasability is very poor. In particular, addition of stearic acid causes a decrease in the intrinsic viscosity and static strength of the molded article.

COMPARATIVE EXAMPLES 6 AND 7

Thirty parts of a chopped strand of glass fibers having a length of 3 mm and 0.3 part of WAX-S used in Comparative Example 1 or the partial ester of WAX-S with 1,3-butanediol used in Comparative Example 2 were added to 70 parts by weight of polybutylene terephthalate resin dried at 130° C. for 3 hours and having an intrinsic viscosity, measured at 35° C. in ortho-chlorophenol, of 0.90 and they were uniformly mixed. The mixture was kneaded and extruded by a vent-equipped extruder having a screw diameter of 30 mm while removing the air from the vent. During the extrusion, the barrel temperature was maintained at 270° C., and the average rate of extrusion was about 2 kg/hr. The extrudate was passed through cooling water, and cut by a cutter to form molding pellets. The average length of the glass fibers was 0.28 mm.

Sodium acetate powder (0.1 part) was added to 100 parts of the pellets, and they were uniformly mixed in a V-type blender. The mixture was then molded under the same molding conditions as in Example 1 except that the cylinder temperature was set at 250° C. The mold releasability and static strength of the molded article were measured, and the results are shown in Table 2.

in Comparative Examples 1 and 2. It is however seen that the esterification product of WAX-S shows a very low mold releasing effect on the polyethylene terephthalate resin, but shows a great mold releasing effect on the polybutylene terephthalate resins. Thus, the effect of the variations in the degree of esterification of the montan wax acid on the mold releasability of the resulting composition differs greatly between the polyethylene terephthalate resin and the polybutylene terephthalate resin which fall into terephthalate ester polymers. Accordingly, the neutralization value and saponification value of the montan wax acid specified in the present invention are limited to polyethylene terephthalate resins.

EXAMPLE 3

One hundred parts of polyethylene terephthalate resin dried at 120° C. for 5 hours and having an intrinsic viscosity of 0.72, 42 parts of a chopped strand of glass fibers having a fiber length of 3 mm, 0.3 part by weight of an esterification product obtained by partially esterifying WAX-S with 0.5 equivalent of n-butanol, and 0.15 part of sodium stearate were uniformly mixed by a tumbler, and then kneaded and extruded under the same conditions as in Example 1 to form molding pellets. The average length of the glass fibers was about 0.34 mm.

The WAX-S ester used as component (C) had a neutralization value of 65 and a saponification value of 143.

The molding pellets were molded under the same conditions as in Example 1 to form a molded article. The molded article had very good surface properties with gloss. The mold releasing index and static strength of molded article were measured, and the results were as follows:

Mold releasing index: 12 kg-weight
Tensile strength: 1540 kg/cm$^2$
Flexural strength: 2030 kg/cm$^2$
Flexural modulus: 97000 kg/cm$^2$

EXAMPLE 4

One hundred parts of polyethylene terephthalate resin dried at 120° C. for 5 hours and having an intrinsic viscosity of 0.723, 14 parts of a chopped strand of glass fibers having a fiber length of 3 mm, 28 parts of talc, 0.15 part of potassium benzoate and 0.3 part of an esterification product (NV=69, SV=153) obtained by partially esterifying WAX-S with 0.4 equivalent of ethylene glycol were uniformly mixed in a V-type blender, and then kneaded and extruded under the same conditions as in Example 1 to form molding pellets. The average length of the glass fibers was 0.38 mm.

The pellets were molded. The mold releasability of the molded article was very good, and no trouble in molding occurred. The resulting molded article has a very beautiful surface with good gloss. The mold releasing index, and the intrinsic viscosity and static strength of the molded article were measured, and the results

TABLE 2

| Comparative Example | Component (C) | | | Mold releasing index | Intrinsic viscosity of the molded product | Tensile strength (kg/cm$^2$) | Flexural strength (kg/cm$^2$) | Flexural modulus (kg/cm$^2$) |
|---|---|---|---|---|---|---|---|---|
| | Type | NV | SV | | | | | |
| 6 | WAX—S | 148 | 156 | 9 | 0.72 | 1350 | 1700 | 101000 |
| 7 | WAX—S ester | 18 | 147 | 8 | 0.85 | 1450 | 1900 | 98000 |

It is seen that the use of WAX-S for the polybutylene terephthalate resin also decreases static strength as in the case of the polyethylene terephthalate resin shown were as follows:

Mold releasing index: 4 kg-weight
Tensile strength: 1010 kg/cm²
Flexural strength: 1390 kg/cm²
Instrinsic viscosity: 0.65

EXAMPLES 5 AND 6 AND COMPARATIVE EXAMPLES 8 TO 12

Seventy parts of polyethylene terephthalate resin dried at 120° C. for 5 hours and having an intrinsic viscosity of 0.64, 30 parts of a chopped strand of glass fibers having a length of 3 mm and each of the components (C) shown in Table 3 in the amounts indicated were uniformly mixed in a V-type blender.

The mixture was melt-mixed in an extruder having a screw diameter of 65 mm and a barrel temperature of 280° C., and the thread extruded from the die was cooled and cut to form molding pellets. The average length of the glass fibers was about 0.33 mm.

One hundred parts of the molding pellets were uniformly mixed with 5 parts of an ionic copolymer powder (component D)(an ionic copolymer composed of 90 parts of ethylene and 10 parts of methacrylic acid with its carboxyl groups being neutralized with a sodium ion; the copolymer had a melt index, measured in accordance with ASTM-D1238-57T, of less than 0.1 g/10 minutes, and a particle size of 300 to 500 microns) in a V-type blender. The mixture was then molded. The mold releasability of the molded article during molding, and the intrinsic viscosity and static strength of the molded article are summarized in Table 3.

TABLE 3

| Example (Ex.) or Comparative Example (CEx.) | Type | Component (C) NV | SV | SV—NV | Amount (parts) |
| --- | --- | --- | --- | --- | --- |
| CEx. 8 | WAX—S | 148 | 156 | 8 | 0.5 |
| Ex. 5 | WAX—S/1,3-butanediol ester | 91 | 152 | 61 | 0.5 |
| Ex. 6 | WAX—S/1,3-butanediol ester | 68 | 150 | 82 | 0.5 |
| CEx. 9 | WAX—S/1,3-butanediol ester | 18 | 147 | 129 | 0.5 |
| CEx. 10 | WAX—S/1,3-butanediol ester | 91 | 152 | 61 | 4 |
| CEx. 11 | Stearic acid | 204 | 206 | 2 | 0.5 |
| CEx. 12 | Stearic acid/n-butanol ester | 56 | 193 | 137 | 0.5 |

| Example (Ex.) or Comparative Example (CEx.) | Properties of the molded article | | | | |
| --- | --- | --- | --- | --- | --- |
| | Mold releasing index (kg-weight) | Intrinsic viscosity | Tensile strength (kg/cm²) | Flexural strength (kg/cm²) | Flexural modulus (kg/cm²) |
| CEx. 8 | 5 | 0.53 | 1310 | 1720 | 90,000 |
| Ex. 5 | 6 | 0.57 | 1520 | 2050 | 91,000 |
| Ex. 6 | 9 | 0.60 | 1500 | 2090 | 92,000 |
| CEx. 9 | 57 | 0.60 | 1490 | 2050 | 91,000 |
| CEx. 10 | 4 | 0.45 | 1210 | 1720 | 89,000 |
| CEx. 11 | 45 | 0.50 | 1220 | 1750 | 90,000 |
| CEx. 12 | 71 | 0.56 | 1420 | 1970 | 89,000 |

All of the molded articles obtained in these examples had excellent surface properties with a glossy and beautiful surface, but their mold releasabilities and static strengths varied depending upon the type and amount of the component (C) added.

WAX-S (a product of Hoechst AG of West Germany) used in Comparative Example 8 is montan wax acid described hereinabove. The mold releasability obtained by using this wax acid is very good, but its use markedly reduces the intrinsic viscosity and static strength of the resulting molded article.

When esterification products obtained by partially esterifying the carboxyl groups of WAX-S with 1,3-butanediol are used, their effects on mold releasability and static strength vary depending upon the degree of esterification. In Examples 5 and 6, esterification products obtained by esterifying WAX-S with 0.35 equivalent and 0.5 equivalent of 1,3-butanediol are used as component (C), and both excellent mold releasability and static strength are obtained.

But in Comparative Example 9 in which a partially esterified product obtained by reacting WAX-S with 0.83 equivalent of 1,3-butanediol is used, no decrease in static strength is noted. But the mold releasability of the resulting molded article is very poor and the molded article greatly swells by the pressure of the knockout pin during mold releasing.

In Comparative Example 10, the WAX-S ester used in Example 5 was added in a large amount. In this case, no problem arises in moldability, but a drastic decrease in static strength is noted.

In Comparative Examples 11 and 12, stearic acid and a product obtained by esterifiying stearic acid with 0.7 equivalent of 1,3-butanediol are respectively used. In both of these examples, the mold releasability is very poor. In particular, the addition of stearic acid results in a reduction in the intrinsic viscosity and static strength of the molded article.

COMPARATIVE EXAMPLES 13 AND 14

Seventy parts of polybutylene terephthalate resin dried at 130° C. for 3 hours and having an intrinsic viscosity of 0.90, 30 parts of a chopped strand of glass fibers having a length of 3 mm and 0.3 part of WAX-S used in Comparative Example 8 or a partially esterified product of WAX-S with 1,3-butanediol were uniformly blended. The mixture was kneaded and extruded in a vent-equipped extruder having a screw diameter of 30 mm while removing air from the vent. During the extrusion, the barrel temperature was maintained at 270° C., and the average amount of extrusion was kept at about 2 kg/hr. The extrudate was passed through cooling water, and cut by a cutter to form molding pellets.

One hundred parts of the pellets and 5 parts of the same ionic copolymer powder as used in Example 5 were added and uniformly mixed in a V-type blender, and the mixture was molded under the same conditions as in Example 5. The mold releasability and static strength of the molded articles were measured, and the results are shown in Table 4.

TABLE 4

| Comparative Example | Component (C) Type | NV | SV | Mold releasing index | Properties of the molded article | | | |
| --- | --- | --- | --- | --- | --- | --- | --- | --- |
| | | | | | Intrinsic viscosity | Tensile strength (kg/cm²) | Flexural strength (kg/cm²) | Flexural modulus (kg/cm²) |
| 13 | WAX—S | 148 | 156 | 7 | 0.72 | 1340 | 1710 | 940000 |
| 14 | WAX—S | 18 | 147 | 6 | 0.85 | 1460 | 1920 | 910000 |

TABLE 4-continued

| Comparative Example | Component (C) Type | NV | SV | Mold releasing index | Properties of the molded article | | |
|---|---|---|---|---|---|---|---|
| | | | | | Intrinsic viscosity | Tensile strength (kg/cm$^2$) | Flexural strength (kg/cm$^2$) | Flexural modulus (kg/cm$^2$) |
| | ester | | | | | | |

Similar results to those obtained in Comparative Examples 6 and 7 were obtained.

EXAMPLE 7

One hundred parts of polyethylene terephthalate resin dried at 120° C. for 5 hours and having an intrinsic viscosity of 0.72, 42 parts of a chopped strand of glass fibers having a length of 3 mm, 0.3 part of an esterification product of WAX-S with 0.5 equivalent of n-butanol, and 25 parts of an ionic copolymer (particle size about 500 microns) obtained by grafting 6% of acrylic acid to high-pressure polyethylene and neutralizing the resulting graft copolymer with sodium hydroxide were uniformly mixed in a tumbler, and then kneaded and extruded under the same conditions as in Example 5 to form molding pellets.

WAX-S ester used as component (C) had a neutralization value of 65 and a saponification value of 143.

The molded article obtained by using the pellets had a very good appearance with gloss. The mold releasing index and static strength of the molded article were as follows:
Mold releasing index: 12 kg-weight
Tensile strength: 1510 kg/cm$^2$
Flexural strength: 1920 kg/cm$^2$
Flexural modulus: 90,000 kg/cm$^2$

EXAMPLE 8

One hundred parts of polyethylene terephthalate resin dried at 120° C. for 5 hours and having an intrinsic viscosity of 0.72, 14 parts of a chopped strand of glass fibers having a length of 3 mm, 28 parts of talc, 3 parts of an ionic copolymer (composed of 90 parts of ethylene and 10 parts of methacrylic acid with its carboxyl groups being neutralized with a sodium ion and having a melt index, in accordance with ASTM-D-1238-57-T, of less than 0.1 g/10 minutes and a particle size of 300 to 500 microns) and 0.3 part of a partially esterified product of WAX-S with 0.4 equivalent of ethylene glycol (NV=69, SV=153) were uniformly mixed in a V-type blender, and then kneaded and extruded under the same conditions as in Example 5 to form molding pellets.

The pellets were molded under the same conditions as in Example 5. The mold releasability of the molded article during molding was very good, and no problem arose in molding.

The resulting molded article had a beautiful appearance with good gloss.

The mold releasing index, intrinsic viscosity and static strength of the molded article were as follows:
Mold releasing index: 4 kg-weight
Tensile strength: 1060 kg/cm$^2$
Flexural strength: 1420 kg/cm$^2$
Intrinsic viscosity: 0.63

What we claim is:

1. A glass fiber-reinforced thermoplastic polyester composition composed of
   (A) 100 parts by weight of a polyethylene terephthalate resin having an intrinsic viscosity, measured at 35° C. in ortho-chlorophenol, of from 0.4 to 0.9 and comprising at least 80 mole%, based on the total acid component, of terephthalic acid or an ester-forming derivative thereof and at least 80 mole%, based on the total polyol component, of ethylene glycol or an ester-forming derivative thereof,
   (B) 5 to 200 parts by weight of glass fibers having an average length of at least 0.2 mm,
   (C) 0.05 to 3 parts by weight of a partially esterified montan wax acid having a neutralization value (NV) and a saponification value (SV) which are in the following relation $$50 \leq NV \leq 110 \quad (1)$$

$$100 \leq SV \leq 180 \quad (2)$$

$$10 \leq (SV-NV) \leq 100 \quad (3)$$

and
   (D) at least one component selected from the group consisting of
   (D$_1$) 0.01 to 3 parts by weight of a sodium or potassium salt of a monocarboxylic acid having 2 to 28 carbon atoms and
   (D$_2$) 0.1 to 10 parts by weight of an ionic copolymer of an α-olefin and an α, β-unsaturated carboxylic acid, said copolymer containing a mono- to trivalent metal ion.

2. The composition of claim 1 which further contains at least one additive selected from the group consisting of nucleating agents, coloring agents, stabilizers, fire retardants, ultraviolet absorbers, antioxidants, lubricants, coloration inhibitors, fillers, other resins and antistatic agents.

3. The composition of claim 1 wherein the glass fibers are surface-treated with an epoxy compound having at least two epoxy groups in the molecule.

4. The composition of claim 1 wherein the component (D$_1$) is present.

5. The composition of claim 1 wherein the component (D$_2$) is present.

6. The composition of claim 1 wherein the polyethylene terephthalate resin (A) has an intrinsic viscosity of from 0.45 to 0.8 and comprises at least 90 mole%, based on the total acid component, of terephthalic acid or an ester-forming derivative thereof and at least 90 mole%, based on the total polyol component, of ethylene glycol or an ester-forming derivative thereof.

7. The composition of claim 3 wherein the amount of the surface-coating epoxy compound is from 0.1 to 10% by weight, based on the weight of the glass fibers (B).

8. The composition of claim 1 which is composed of
   (A) 70 parts of polyethylene terephthalate resin having an intrinsic viscosity of about 0.64;
   (B) about 30 parts of glass fibers having an average length of about 0.36 mm;
   (C) about 0.5 parts of montan wax acid partially esterified with from about 0.35 to 0.5 equivalents of 1,3-butanediol and having a neutralization value (NV) of from about 68 to 91, a saponification value (SV) of from about 150 to 152, and (D) about 0.1 part of sodium acetate powder per 100 parts of (A)+(B)+(C).

9. The composition of claim 1 which is composed of
(A) 100 parts of polyethylene terephthalate resin having an intrinsic viscosity of about 0.72,
(B) about 42 parts of glass fibers having an average length of about 0.34 mm,
(C) about 0.3 part of the esterification product of montan wax acid and about 0.5 equivalent of n-butanol, and having a NV value of about 65 and an SV value of about 143, and
(D) about 0.15 part sodium stearate.

10. The composition of claim 1 which is composed of
(A) 100 parts of polyethylene terephthalate resin having an intrinsic viscosity of about 0.72,
(B) about 14 parts of glass fibers having an average length of about 0.38 mm,
(C) about 0.3 parts of montan wax acid partially esterified with about 0.4 equivalent of ethylene glycol and having an NV value of about 69 and an SV value of about 153,
(D) about 0.15 part potassium benzoate, and
(E) about 28 parts talc.

11. The composition of claim 1 which is composed of
(A) 70 parts polyethylene terephthalate resin having an intrinsic viscosity of about 0.64,
(B) about 30 parts glass fibers having an average length of about 0.33 mm,
(C) about 0.5 parts, per 100 parts (A)+(B), of montan wax acid partially esterified with from about 0.35 to about 0.5 equivalent of 1,3-butanediol and having an NV value of from about 68 to 91 and an SV value of from about 150 to 152, and
(D) about 5 parts, per 100 parts of (A)+(B)+(C) of an ionic copolymer powder composed of 90 parts ethylene and 10 parts methacrylic acid, the carboxylic groups of the methacrylic acid being neutralized with sodium ion.

12. The composition of claim 1 which is composed of
(A) 100 parts of polyethylene terephthalate resin having an intrinsic viscosity of about 0.72,
(B) about 42 parts of glass fibers having an average length of about 0.34 mm,
(C) about 0.3 part of the esterification product of montan wax acid and about 0.5 equivalent of n-butanol, and having an NV value of about 65 and an SV value of about 143, and
(D) about 2.5 parts of an ionic copolymer obtained by grafting 6% acrylic acid to high-pressure polyethylene and neutralizing the resulting graft copolymer with sodium hydroxide.

13. The composition of claim 1 which is composed of
(A) 100 parts of polyethylene terephthalate resin having an intrinsic viscosity of about 0.72,
(B) about 14 parts of glass fibers having an average length of about 0.38 mm,
(C) about 0.3 parts of montan wax acid partially esterified with about 0.4 equivalent of ethylene glycol and having an NV value of about 69 and an SV value of about 153,
(D) about 3 parts of an ionic copolymer powder composed of 90 parts ethylene and 10 parts methacrylic acid, the carboxylic groups of the methacrylic acid being neutralized with sodium ion.

* * * * *

UNITED STATES PATENT AND TRADEMARK OFFICE
CERTIFICATE OF CORRECTION

PATENT NO. : 4,506,043
DATED : March 19, 1985
INVENTOR(S) : YOSHINARI OGAWA, ET AL.

It is certified that error appears in the above-identified patent and that said Letters Patent is hereby corrected as shown below:

IN THE SPECIFICATION

Column 19, line 17, delete "25", insert --2.5--.

Claim 1, line 14, before "montan", insert -- product of --.

Signed and Sealed this

Tenth Day of December 1985

[SEAL]

Attest:

DONALD J. QUIGG

Attesting Officer

Commissioner of Patents and Trademarks